United States Patent
Sheng et al.

(10) Patent No.: US 9,983,718 B2
(45) Date of Patent: *May 29, 2018

(54) DETECTION OF TYPE OF OBJECT USED TO PROVIDE A TOUCH CONTACT INPUT

(71) Applicant: Sentons Inc., Grand Cayman (KY)

(72) Inventors: Samuel W. Sheng, Saratoga, CA (US); Shih-Ming Shih, San Jose, CA (US); Shirish A. Altekar, Palo Alto, CA (US)

(73) Assignee: Sentons Inc. (KY)

( * ) Notice: Subject to any disclaimer, the term of this patent is extended or adjusted under 35 U.S.C. 154(b) by 59 days.

This patent is subject to a terminal disclaimer.

(21) Appl. No.: 14/882,193

(22) Filed: Oct. 13, 2015

(65) Prior Publication Data

US 2016/0034100 A1 Feb. 4, 2016

Related U.S. Application Data

(63) Continuation of application No. 13/945,649, filed on Jul. 18, 2013, now Pat. No. 9,189,109.

(Continued)

(51) Int. Cl.
*G06F 3/043* (2006.01)
*G06F 3/041* (2006.01)

(52) U.S. Cl.
CPC .......... *G06F 3/0416* (2013.01); *G06F 3/0436* (2013.01)

(58) Field of Classification Search
CPC .......... G06F 3/041; G06F 3/042; G06F 3/043; G06F 3/0433; G06F 3/044; G06F 3/046
See application file for complete search history.

(56) References Cited

U.S. PATENT DOCUMENTS 4,488,000 A 12/1984 Glenn
4,594,695 A 6/1986 Garconnat
(Continued)

FOREIGN PATENT DOCUMENTS

CN 101373415 B 2/2009
CN 101669088 B 3/2010
(Continued)

OTHER PUBLICATIONS

Liu et al., 'Acoustic Wave Approach for Multi-Touch Tactile Sensing', Micro-NanoMechatronics and Human Science, 2009. MHS 2009. International Symposium, Nov. 9-11, 2009.
(Continued)

*Primary Examiner* — Vijay Shankar
(74) *Attorney, Agent, or Firm* — Van Pelt, Yi & James LLP

(57) ABSTRACT

A signal to be used to propagate a freely propagating signal through a propagating medium with a touch input surface is sent. The freely propagating signal has been allowed to freely propagate through the propagating medium in a plurality directions to a plurality of receivers on multiple axes of the propagating medium. A received signal detected due to a touch input object contacting the touch input surface is received. The received signal includes the freely propagating signal that has been disturbed by the touch input object. At least a portion of the received signal is compared with one or more reference signals of one or more touch input object types. Based at least in part on the comparison a location of the touch input object contacting the surface is determined.

20 Claims, 11 Drawing Sheets

Related U.S. Application Data

(60) Provisional application No. 61/673,103, filed on Jul. 18, 2012.

(56) References Cited

U.S. PATENT DOCUMENTS

| | | |
|---|---|---|
| 5,091,406 A | 2/1992 | Toda |
| 5,334,805 A | 8/1994 | Knowles |
| 5,451,723 A | 9/1995 | Huang |
| 5,563,849 A | 10/1996 | Hall |
| 5,573,077 A | 11/1996 | Knowles |
| 5,635,643 A | 6/1997 | Maji |
| 5,637,839 A | 6/1997 | Yamaguchi |
| 5,708,460 A | 1/1998 | Young |
| 5,912,659 A | 6/1999 | Rutledge |
| 6,232,960 B1 | 5/2001 | Goldman |
| 6,236,391 B1 | 5/2001 | Kent |
| 6,262,946 B1 | 7/2001 | Khuri-Yakub |
| 6,307,942 B1 | 10/2001 | Azima |
| 6,492,979 B1 | 12/2002 | Kent |
| 6,498,603 B1 | 12/2002 | Wallace |
| 6,633,280 B1 | 10/2003 | Matsumoto |
| 6,788,296 B2 | 9/2004 | Ikeda |
| 6,798,403 B2 | 9/2004 | Kitada |
| 7,218,248 B2 | 5/2007 | Kong |
| RE39,881 E | 10/2007 | Flowers |
| 7,554,246 B2 | 6/2009 | Maruyama |
| 7,880,721 B2 | 2/2011 | Suzuki |
| 8,059,107 B2 | 11/2011 | Hill |
| 8,358,277 B2 | 1/2013 | Mosby |
| 8,436,806 B2 | 5/2013 | Almalki |
| 8,787,599 B2 | 7/2014 | Grattan |
| 8,917,249 B1 | 12/2014 | Buuck |
| 9,030,436 B2 | 5/2015 | Ikeda |
| 9,099,971 B2 | 8/2015 | Lynn |
| 9,189,109 B2 * | 11/2015 | Sheng ............... G06F 3/0416 |
| 9,348,468 B2 | 5/2016 | Altekar |
| 9,594,450 B2 | 3/2017 | Lynn |
| 2001/0050677 A1 | 12/2001 | Tosaya |
| 2002/0047833 A1 | 4/2002 | Kitada |
| 2002/0185981 A1 | 12/2002 | Dietz |
| 2003/0161484 A1 | 8/2003 | Kanamori |
| 2003/0189745 A1 | 10/2003 | Kikuchi |
| 2003/0197691 A1 | 10/2003 | Fujiwara |
| 2003/0206162 A1 | 11/2003 | Roberts |
| 2004/0133366 A1 | 7/2004 | Sullivan |
| 2004/0160421 A1 | 8/2004 | Sullivan |
| 2004/0183788 A1 | 9/2004 | Kurashima |
| 2004/0203594 A1 | 10/2004 | Kotzin |
| 2004/0239649 A1 | 12/2004 | Ludtke |
| 2004/0246239 A1 | 12/2004 | Knowles |
| 2005/0063553 A1 | 3/2005 | Ozawa |
| 2005/0146511 A1 | 7/2005 | Hill |
| 2005/0146512 A1 | 7/2005 | Hill |
| 2005/0174338 A1 | 8/2005 | Ing |
| 2005/0226455 A1 | 10/2005 | Aubauer |
| 2006/0071912 A1 | 4/2006 | Hill |
| 2006/0109261 A1 * | 5/2006 | Chou ............... G06F 3/0436 345/177 |
| 2006/0114233 A1 | 6/2006 | Radivojevic |
| 2006/0139340 A1 | 6/2006 | Geaghan |
| 2006/0152499 A1 | 7/2006 | Roberts |
| 2006/0166681 A1 | 7/2006 | Lohbihler |
| 2006/0197753 A1 | 9/2006 | Hotelling |
| 2006/0262104 A1 | 11/2006 | Sullivan |
| 2006/0279548 A1 | 12/2006 | Geaghan |
| 2006/0284841 A1 | 12/2006 | Hong |
| 2007/0019825 A1 | 1/2007 | Marumoto |
| 2007/0109274 A1 | 5/2007 | Reynolds |
| 2007/0165009 A1 | 7/2007 | Sakurai |
| 2007/0171212 A1 | 7/2007 | Sakurai |
| 2007/0183520 A1 | 8/2007 | Kim |
| 2007/0211022 A1 | 9/2007 | Boillot |
| 2007/0214462 A1 | 9/2007 | Boillot |
| 2007/0229479 A1 | 10/2007 | Choo |
| 2007/0279398 A1 | 12/2007 | Tsumura |
| 2008/0018618 A1 | 1/2008 | Hill |
| 2008/0030479 A1 | 2/2008 | Lowles |
| 2008/0062151 A1 * | 3/2008 | Kent ............... G06F 3/0418 345/177 |
| 2008/0081671 A1 | 4/2008 | Wang |
| 2008/0105470 A1 | 5/2008 | Van De Ven |
| 2008/0111788 A1 | 5/2008 | Rosenberg |
| 2008/0169132 A1 | 7/2008 | Ding |
| 2008/0174565 A1 | 7/2008 | Chang |
| 2008/0198145 A1 | 8/2008 | Knowles |
| 2008/0231612 A1 | 9/2008 | Hill |
| 2008/0259030 A1 | 10/2008 | Holtzman |
| 2008/0266266 A1 | 10/2008 | Kent |
| 2008/0284755 A1 | 11/2008 | Hardie-Bick |
| 2009/0009488 A1 | 1/2009 | D'Souza |
| 2009/0103853 A1 | 4/2009 | Daniel |
| 2009/0116661 A1 | 5/2009 | Hetherington |
| 2009/0146533 A1 | 6/2009 | Leskinen |
| 2009/0160728 A1 | 6/2009 | Emrick |
| 2009/0167704 A1 | 7/2009 | Terlizzi |
| 2009/0237372 A1 | 9/2009 | Kim |
| 2009/0271004 A1 | 10/2009 | Zecchin |
| 2009/0273583 A1 | 11/2009 | Norhammar |
| 2009/0309853 A1 | 12/2009 | Hildebrandt |
| 2009/0315848 A1 | 12/2009 | Ku |
| 2010/0026667 A1 | 2/2010 | Bernstein |
| 2010/0027810 A1 | 2/2010 | Marton |
| 2010/0044121 A1 | 2/2010 | Simon |
| 2010/0045635 A1 | 2/2010 | Soo |
| 2010/0079264 A1 | 4/2010 | Hoellwarth |
| 2010/0117933 A1 | 5/2010 | Gothard |
| 2010/0117993 A1 | 5/2010 | Kent |
| 2010/0141408 A1 | 6/2010 | Doy |
| 2010/0156818 A1 | 6/2010 | Burrough |
| 2010/0165215 A1 | 7/2010 | Shim |
| 2010/0185989 A1 | 7/2010 | Shiplacoff |
| 2010/0188356 A1 | 7/2010 | Vu |
| 2010/0245265 A1 | 9/2010 | Sato |
| 2010/0269040 A1 | 10/2010 | Lee |
| 2010/0277431 A1 | 11/2010 | Klinghult |
| 2010/0315373 A1 | 12/2010 | Steinhauser |
| 2010/0321312 A1 | 12/2010 | Han |
| 2010/0321325 A1 | 12/2010 | Springer |
| 2010/0321337 A1 | 12/2010 | Liao |
| 2011/0001707 A1 | 1/2011 | Faubert |
| 2011/0001708 A1 * | 1/2011 | Sleeman ............... G06F 3/0416 345/173 |
| 2011/0012717 A1 | 1/2011 | Pance |
| 2011/0018695 A1 | 1/2011 | Bells |
| 2011/0025649 A1 * | 2/2011 | Sheikhzadeh Nadjar ............... G06F 3/043 345/177 |
| 2011/0042152 A1 | 2/2011 | Wu |
| 2011/0057903 A1 | 3/2011 | Yamano |
| 2011/0063228 A1 | 3/2011 | St Pierre |
| 2011/0080350 A1 | 4/2011 | Almalki |
| 2011/0084912 A1 | 4/2011 | Almalki |
| 2011/0084937 A1 | 4/2011 | Chang |
| 2011/0155479 A1 | 6/2011 | Oda |
| 2011/0156967 A1 | 6/2011 | Oh |
| 2011/0167391 A1 | 7/2011 | Momeyer |
| 2011/0175813 A1 | 7/2011 | Sarwar |
| 2011/0182443 A1 | 7/2011 | Gant |
| 2011/0191680 A1 | 8/2011 | Chae |
| 2011/0199342 A1 | 8/2011 | Vartanian |
| 2011/0213223 A1 | 9/2011 | Kruglick |
| 2011/0222372 A1 | 9/2011 | O'Donovan |
| 2011/0234545 A1 | 9/2011 | Tanaka |
| 2011/0260990 A1 | 10/2011 | Ali |
| 2011/0279382 A1 | 11/2011 | Pertuit |
| 2011/0298670 A1 | 12/2011 | Jung |
| 2011/0300845 A1 | 12/2011 | Lee |
| 2011/0304577 A1 | 12/2011 | Brown |
| 2011/0316790 A1 | 12/2011 | Ollila |
| 2012/0001875 A1 | 1/2012 | Li |
| 2012/0002820 A1 | 1/2012 | Leichter |
| 2012/0007837 A1 | 1/2012 | Kent |
| 2012/0026114 A1 | 2/2012 | Lee |

(56) References Cited

U.S. PATENT DOCUMENTS

| | | |
|---|---|---|
| 2012/0032928 A1 | 2/2012 | Alberth |
| 2012/0050230 A1 | 3/2012 | Harris |
| 2012/0062564 A1 | 3/2012 | Miyashita |
| 2012/0068939 A1 | 3/2012 | Pemberton-Pigott |
| 2012/0068970 A1 | 3/2012 | Pemberton-Pigott |
| 2012/0081337 A1 | 4/2012 | Camp, Jr. |
| 2012/0088548 A1 | 4/2012 | Yun |
| 2012/0120031 A1 | 5/2012 | Thuillier |
| 2012/0126962 A1 | 5/2012 | Ujii |
| 2012/0127088 A1 | 5/2012 | Pance |
| 2012/0140954 A1 | 6/2012 | Ranta |
| 2012/0149437 A1 | 6/2012 | Zurek |
| 2012/0188194 A1 | 7/2012 | Sulem |
| 2012/0188889 A1 | 7/2012 | Sambhwani |
| 2012/0194466 A1 | 8/2012 | Posamentier |
| 2012/0200517 A1 | 8/2012 | Nikolovski |
| 2012/0206154 A1 | 8/2012 | Pant |
| 2012/0229407 A1 | 9/2012 | Harris |
| 2012/0232834 A1 | 9/2012 | Roche |
| 2012/0242603 A1 | 9/2012 | Engelhardt |
| 2012/0272089 A1 | 10/2012 | Hatfield |
| 2012/0278490 A1 | 11/2012 | Sennett |
| 2012/0282944 A1 | 11/2012 | Zhao |
| 2012/0300956 A1 | 11/2012 | Horii |
| 2012/0306823 A1 | 12/2012 | Pance |
| 2013/0011144 A1 | 1/2013 | Amiri |
| 2013/0050154 A1 | 2/2013 | Guy |
| 2013/0057491 A1 | 3/2013 | Chu |
| 2013/0059532 A1 | 3/2013 | Mahanfar |
| 2013/0082970 A1 | 4/2013 | Frey |
| 2013/0141365 A1 | 6/2013 | Lynn |
| 2013/0147768 A1 | 6/2013 | Aroyan |
| 2013/0222274 A1 | 8/2013 | Mori |
| 2013/0234995 A1 | 9/2013 | Son |
| 2013/0249831 A1 | 9/2013 | Harris |
| 2014/0028576 A1 | 1/2014 | Shahparnia |
| 2014/0078070 A1 | 3/2014 | Armstrong-Muntner |
| 2014/0078109 A1 | 3/2014 | Armstrong-Muntner |
| 2014/0185834 A1 | 7/2014 | Frömel |
| 2014/0247250 A1 | 9/2014 | Sheng |
| 2014/0362055 A1 | 12/2014 | Altekar |
| 2014/0368464 A1 | 12/2014 | Singnurkar |
| 2015/0002415 A1 | 1/2015 | Lee |
| 2015/0109239 A1 | 4/2015 | Mao |
| 2015/0199035 A1 | 7/2015 | Chang |
| 2015/0253895 A1 | 9/2015 | Kim |
| 2016/0162044 A1 | 6/2016 | Ciou |
| 2016/0179249 A1 | 6/2016 | Ballan |
| 2016/0209944 A1 | 7/2016 | Shim |
| 2016/0282965 A1 | 9/2016 | Jensen |
| 2016/0349922 A1 | 12/2016 | Choi |
| 2017/0010697 A1 | 1/2017 | Jiang |

FOREIGN PATENT DOCUMENTS

| | | |
|---|---|---|
| FR | 2948787 B1 | 2/2011 |
| KR | 20040017272 | 2/2004 |
| KR | 20070005580 | 1/2007 |
| KR | 20080005990 | 1/2008 |
| KR | 20110001839 | 1/2011 |
| WO | WO-03005292 A1 | 1/2003 |
| WO | WO-2006115947 A3 | 6/2007 |
| WO | WO-2011010037 A1 | 1/2011 |
| WO | WO-2011024434 | 3/2011 |
| WO | WO-2011048433 A1 | 4/2011 |
| WO | WO-2011051722 | 5/2011 |
| WO | WO-2012010912 A2 | 1/2012 |
| WO | WO-2014209757 A1 | 12/2014 |
| WO | WO-2015027017 | 2/2015 |

OTHER PUBLICATIONS

T Benedict et al. 'The joint estimation of signal and noise from the sum envelope.' IEEE Transactions on Information Theory 13.3, pp. 447-454. Jul. 1, 1967.

* cited by examiner

DETECTION OF TYPE OF OBJECT USED TO PROVIDE A TOUCH CONTACT INPUT

CROSS REFERENCE TO OTHER APPLICATIONS

This application is a continuation of co-pending U.S. patent application Ser. No. 13/945,649, entitled DETECTION OF TYPE OF OBJECT USED TO PROVIDE A TOUCH CONTACT INPUT filed Jul. 18, 2013 which is incorporated herein by reference for all purposes, which claims priority to U.S. Provisional Application No. 61/673,103, entitled DETECTION OF NUMBER OF CONTACT POINTS IN A TOUCH SENSING SYSTEM filed Jul. 18, 2012 which is incorporated herein by reference for all purposes.

BACKGROUND OF THE INVENTION

Popularity of devices such as tablet computers and smartphones has spawned an ecosystem of software applications utilizing touch input detection. The ability to reliably and efficiently detect touch input location on a display surface has enabled applications to take advantage of new user interface interaction patterns to offer enhanced application usability across a wide range of inexpensive devices. Further enhanced usability may be enabled if it is possible to detect a type of object that is providing the touch input. For example, the ability to distinguish between a human finger and a stylus contacting a touchscreen may be utilized by an application to provide different functionality based on the type of object used to provide the touch input. It has been difficult for prior touch input devices to reliably and inexpensively detect a type of object contacting the touch input surface of a device. Therefore, there exists a need for a way to more efficiently detect a type of object used to provide a touch input.

BRIEF DESCRIPTION OF THE DRAWINGS

Various embodiments of the invention are disclosed in the following detailed description and the accompanying drawings.

DETAILED DESCRIPTION

Figure 1:
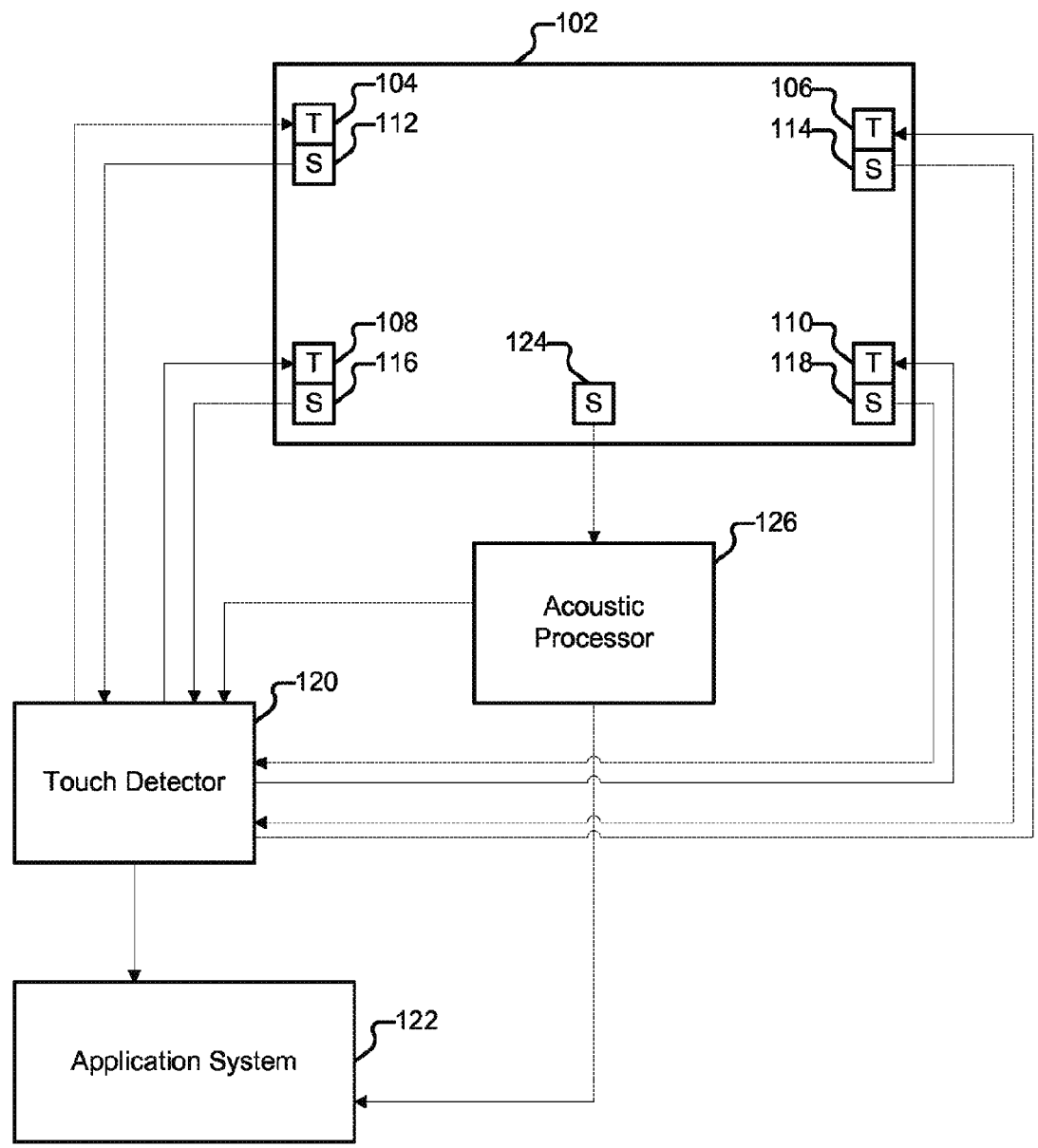
FIG. 1 is a block diagram illustrating an embodiment of a system for detecting a touch input surface disturbance.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Determining a type of object utilized to provide a touch input is disclosed. In some embodiments, a signal that captures a disturbance (e.g., sound, vibration, etc.) by a touch input object contacting a touch input surface is received. For example, when an object contacts a touch input surface, a sound is generated from the object striking the touch input surface and the generated sound is captured by a sensor attached to a medium (e.g., glass) of the touch input surface as an acoustic signal. In some embodiments, the received signal is received from a transducer coupled to a medium of the touch input surface.

At least a portion of the received signal is compared with one or more signatures of one or more touch input object types. For example, for each detectable touch input object type, an associated signature is predetermined (e.g., acoustic signal detected from each sample touch input object type is captured as an signature of the sample touch input object type) and stored in a library of signatures. A type of the touch input object contacting the touch input surface is determined based at least in part on the comparison. For example, if at least a portion of the received signal matches a predetermined signature corresponding to a particular touch input object type, the particular touch input object type is identified as the type of touch input object contacting the touch input surface.

FIG. 1 is a block diagram illustrating an embodiment of a system for detecting a touch input surface disturbance. In some embodiments, the system shown in FIG. 1 is included in a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other objects or devices having surfaces. Propagating signal medium 102 is coupled to transmitters 104, 106, 108, and 110 and sensors 112, 114, 116, and 118. The locations where transmitters 104, 106, 108, and 110 and sensors 112, 114, 116, and 118 have been coupled to propagating signal medium 102, as shown in FIG. 1, are merely an example. Other configurations of transmitter and sensor locations may exist in various embodiments. Although FIG. 1 shows sensors located adjacent to transmitters, sensors may be located apart from transmitters in other embodiments. In various embodiments, the propagating medium includes one or more of the following: panel, table, glass, screen, door, floor, whiteboard, plastic, wood, steel, metal, semiconductor, insulator, conductor, and any medium that is able to propagate an acoustic or ultrasonic signal. For example, medium 102 is glass of a display screen. A first surface of medium 102 includes a surface area where a user may touch to provide a selection input and a substantially opposite surface of medium 102 is coupled to the transmitters and sensors shown in FIG. 1. In various embodiments, a surface of medium 102 is substantially flat, curved, or combinations thereof and may be configured in a variety of shapes such as rectangular, square, oval, circular, trapezoidal, annular, or any combination of these, and the like.

Propagating signal medium 102 is coupled to sensor 124. For example, sensor 124 is coupled to one surface of propagating signal medium 102 and the same or another surface (e.g., opposing surface) of propagating signal medium 102 may be configured to receive a touch input. The location of sensor 124 on propagating signal medium 102, as shown in FIG. 1, is merely an example. Other location configurations of sensor 124 may exist in various embodiments. Although a single sensor 124 has been shown to simplify the illustration, any number of sensors of the type of sensor 124 may be included. In some embodiments, sensor 124 is a sensor dedicated to detecting a number of touch input contacts received on medium 102 and/or a type of object used to contact medium 102 to provide a touch input, and sensors 112, 114, 116, and 118 are dedicated to detecting one or more touch locations of the touch input. For example, sensors 112, 114, 116, and 118 detect ultrasonic frequencies of an active signal that has been disturbed by a touch input contact, and sensor 124 detects audible frequencies of a sound caused by a touch input object striking medium 102. In some embodiments, sensor 124 is one of a plurality of sensors used to identify a number of touch input contacts received on propagating signal medium 102 and/or a type of object used to contact medium 102 to provide a touch input. In an alternative embodiment, one or more of sensors 112, 114, 116, and 118 are used to identify a number of touch input contacts received on medium 102 and/or a type of object used to contact medium 102 to provide a touch input. For example, sensor 124 is not utilized and one or more of sensors 112, 114, 116, and 118 are used to identify a number of touch input contacts received on medium 102 and/or a type of object used to contact medium 102 to provide a touch input in addition to being used to detect a location of a touch input.

Acoustic processor 126 receives signal detected by sensor 124. The received signal may be processed by acoustic processor 126 to identify a number of touch input contacts received on medium 102 and/or a type of object used to contact medium 102 to provide a touch input. In some embodiments, the received signal may be processed/filtered to reduce noise. For example, a component of the received signal that is likely not associated with an acoustic noise of a touch input is filtered/removed. In order to detect noise, one or more signals from sensors 112, 114, 116, and 118 may be utilized. In some embodiments, acoustic processor 126 utilizes a database/library of touch input object waveform signatures to detect a type of object used to contact medium 102. The database may be stored in acoustic processor 126 and/or an external database may be utilized. Acoustic processor 126 outputs one or more identifiers of a number of received touch input contacts and/or type(s) of object(s) used to provide touch input contact(s) to touch detector 120 and/or application system 122. For example, the identifier number of received touch input contacts may be used by touch detector 120 to determine a touch input location for each of the received touch input contacts and the type of identifier may be used by application system 122 to provide different application functionality based on the type of identifier. In an alternative embodiment, the functionality of acoustic processor 126 is provided by touch detector 120 and acoustic processor 126 is not utilized. In some embodiments, acoustic processor 126 and touch detector 120 are integrated on a same chip.

In some embodiments, acoustic processor 126 may be powered down when idle, waiting for an appropriate contact event to be detected by sensors 112, 114, 116, 118, or 124 and/or touch detector 120. In an example where the touch input surface is the screen of a mobile computing device, the device could be in a low power state until an appropriate event is detected to "wakeup" the device.

Although the example of FIG. 1 shows touch input location detection by detecting disturbances of an active signal, in an alternative embodiment, sensor 124 and/or acoustic processor 126 may be utilized with other types of touch input location detection technology to identify a number of touch input contacts received on medium 102 and/or a type of object used to contact medium 102 to provide a touch input. For example, sensor 124 and/or acoustic processor 126 may be utilized with capacitive, resistive, Acoustic Pulse Recognition, or Surface Acoustic Wave-based touch detection technology. In some embodiments using resistive touch technology, a touch input medium is coated with multiple conductive layers that register touches when physical pressure is applied to the layers to force the layers to make physical contact. In some embodiments using capacitive touch technology, a touch input is coated with material that can hold an electrical charge sensitive to a human finger. By detecting the change in the electrical charge due to a touch input, a touch location of the touch input may be detected. In the capacitive touch technology example, transmitters 104, 106, 108, and 110 and sensors 112, 114, 116, and 118 do not exist and instead medium 102 is configured to detect changes in capacitance due to a touch input contact. In some embodiments, Acoustic Pulse Recognition includes transducers attached to the edges of a touchscreen glass that pick up the sound emitted on the glass due to a touch input. In some embodiments, Surface Acoustic Wave-based technology sends ultrasonic waves in a guided pattern using reflectors on the touch screen to detect a touch.

Examples of transmitters 104, 106, 108, and 110 include piezoelectric transducers, electromagnetic transducers, transmitters, sensors, and/or any other transmitters and transducers capable of propagating a signal through medium 102. Examples of sensors 112, 114, 116, 118, and 124 include piezoelectric transducers, electromagnetic transducers, laser vibrometer transmitters, and/or any other sensors and transducers capable of detecting a signal on medium 102. In some embodiments, a transducer is designed to convert acoustic and/or vibrational energy on the touch input surface to an electronic signal for processing. In some embodiments, the transmitters and sensors shown in FIG. 1 are coupled to medium 102 in a manner that allows a user's input to be detected in a predetermined region of medium 102. Although four transmitters and four sensors are shown, any number of transmitters and any number of sensors may be used in other embodiments. For example, two transmitters and three sensors may be used. In some embodiments, a single transducer acts as both a transmitter and a sensor. For example, transmitter 104 and sensor 112 represent a single piezoelectric transducer. In the example shown, transmitter 104 may propagate a signal through medium 102. Sensors 112, 114, 116, and 118 receive the propagated signal. In another embodiment, the transmitters/sensors in FIG. 1 are attached to a flexible cable coupled to medium 102 via an encapsulant and/or glue material and/or fasteners.

Touch detector 120 is connected to the transmitters and sensors shown in FIG. 1. In some embodiments, detector 120 includes one or more of the following: an integrated circuit chip, a printed circuit board, a processor, and other electrical components and connectors. Detector 120 determines and sends a signal to be propagated by transmitters 104, 106, 108, and 110. Detector 120 also receives the signal detected by sensors 112, 114, 116, and 118. The received signals are processed by detector 120 to determine whether a disturbance associated with a user input has been detected at a location on a surface of medium 102 associated with the disturbance. Detector 120 is in communication with application system 122. Application system 122 uses information provided by detector 120. For example, application system 122 receives from detector 120 a coordinate associated with a user touch input that is used by application system 122 to control a software application of application system 122. In some embodiments, application system 122 includes a processor and/or memory/storage. In other embodiments, detector 120 and application system 122 are at least in part included/processed in a single processor. An example of data provided by detector 120 to application system 122 includes one or more of the following associated with a user indication: a location coordinate of a surface of medium 102, a gesture, simultaneous user indications (e.g., multi-touch input), a time, a status, a direction, a velocity, a force magnitude, a proximity magnitude, a pressure, a size, and other measurable or derived information.

Figure 2:
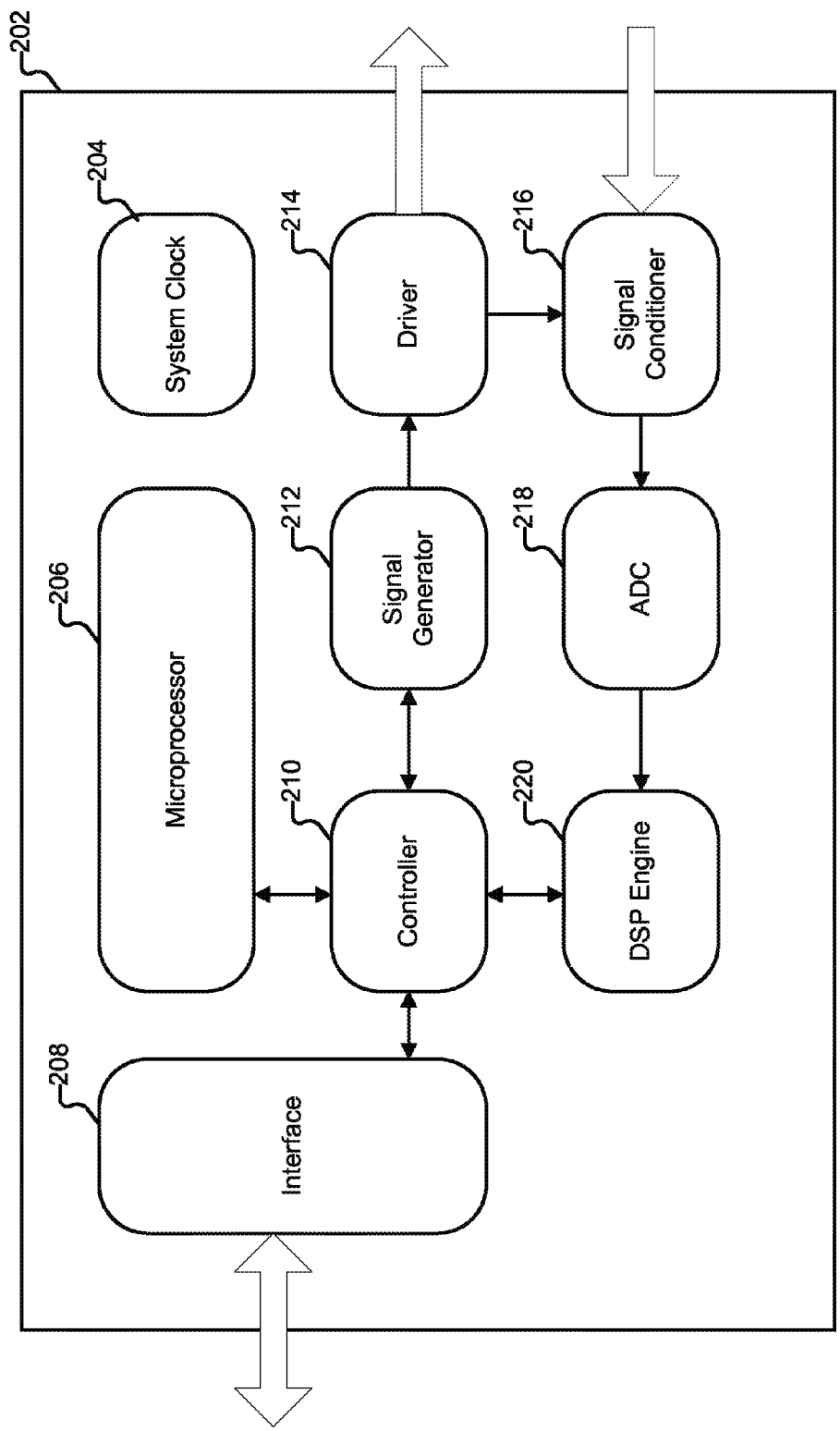
FIG. 2 is a block diagram illustrating an embodiment of a system for detecting a touch input.

FIG. 2 is a block diagram illustrating an embodiment of a system for detecting a touch input. In some embodiments, touch detector 202 is included in touch detector 120 of FIG. 1. In some embodiments, the system of FIG. 2 is integrated in an integrated circuit chip. Touch detector 202 includes system clock 204 that provides a synchronous system time source to one or more other components of detector 202. Controller 210 controls data flow and/or commands between microprocessor 206, interface 208, DSP engine 220, and signal generator 212. In some embodiments, microprocessor 206 processes instructions and/or calculations that can be used to program software/firmware and/or process data of detector 202. In some embodiments, a memory is coupled to microprocessor 206 and is configured to provide microprocessor 206 with instructions. Signal generator 212 generates a signal to be used to propagate a signal such as a signal propagated by transmitter 104 of FIG. 1. For example, signal generator 212 generates a pseudorandom binary sequence signal. Driver 214 receives the signal from generator 212 and drives one or more transmitters, such as transmitters 104, 106, 108, and 110 of FIG. 1, to propagate a signal through a medium.

A signal detected from a sensor such as sensor 112 of FIG. 1 is received by detector 202 and signal conditioner 216 conditions (e.g., filters) the received analog signal for further processing. For example, signal conditioner 216 receives the signal output by driver 214 and performs echo cancellation of the signal received by signal conditioner 216. The conditioned signal is converted to a digital signal by analog-to-digital converter 218. The converted signal is processed by digital signal processor engine 220. For example, DSP engine 220 correlates the converted signal against a reference signal to determine a time domain signal that represents a time delay caused by a touch input on a propagated signal. In some embodiments, DSP engine 220 performs dispersion compensation. For example, the time delay signal that results from correlation is compensated for dispersion in the touch input surface medium and translated to a spatial domain signal that represents a physical distance traveled by the propagated signal disturbed by the touch input. In some embodiments, DSP engine 220 performs base pulse correlation. For example, the spatial domain signal is filtered using a match filter to reduce noise in the signal.

A result of DSP engine 220 may be used by microprocessor 206 to determine a location associated with a user touch input. For example, microprocessor 206 determines a hypothesis location where a touch input may have been received and calculates an expected signal that is expected to be generated if a touch input was received at the hypothesis location and the expected signal is compared with a result of DSP engine 220 to determine whether a touch input was provided at the hypothesis location.

Interface 208 provides an interface for microprocessor 206 and controller 210 that allows an external component to access and/or control detector 202. For example, interface 208 allows detector 202 to communicate with application system 122 of FIG. 1 and provides the application system with location information associated with a user touch input.

Figure 3:
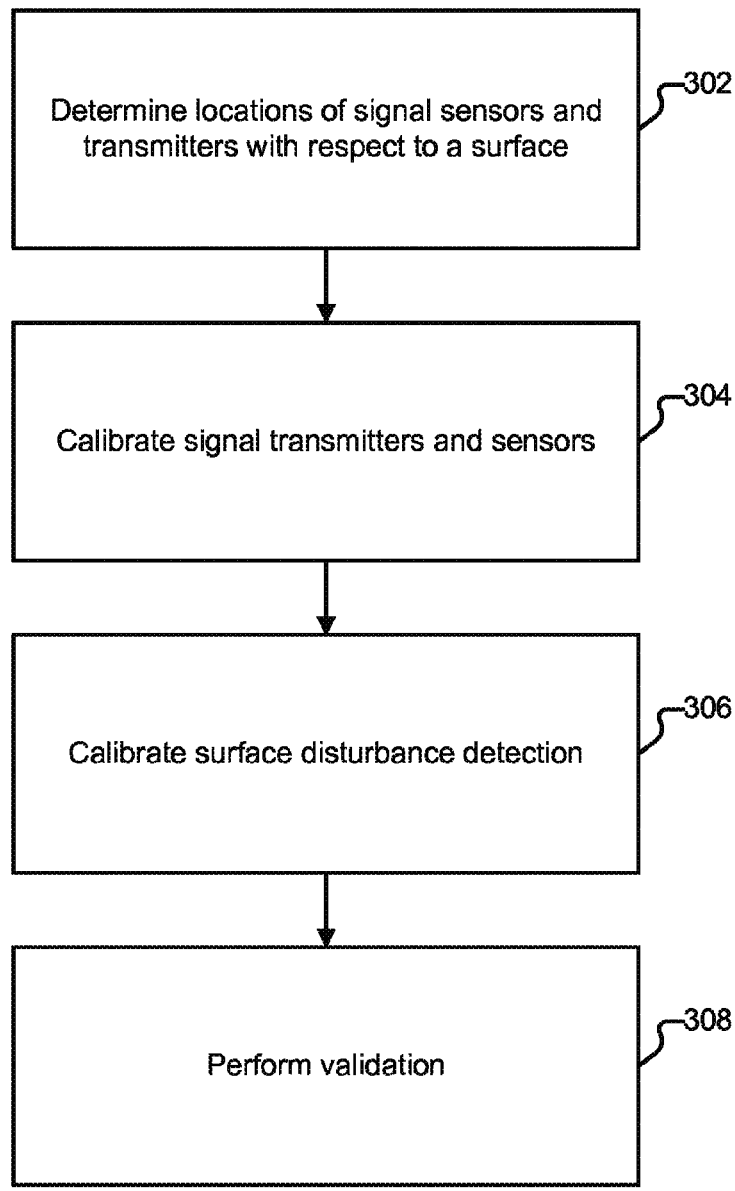
FIG. 3 is a flow chart illustrating an embodiment of a process for calibrating and validating touch detection.

FIG. 3 is a flow chart illustrating an embodiment of a process for calibrating and validating touch detection. In some embodiments, the process of FIG. 3 is used at least in part to calibrate and validate the system of FIG. 1 and/or the system of FIG. 2. At 302, locations of signal transmitters and sensors with respect to a surface are determined. For example, locations of transmitters and sensors shown in FIG. 1 are determined with respect to their location on a surface of medium 102. In some embodiments, determining the locations includes receiving location information. In various embodiments, one or more of the locations may be fixed and/or variable.

At 304, signal transmitters and sensors are calibrated. In some embodiments, calibrating the transmitter includes calibrating a characteristic of a signal driver and/or transmitter (e.g., strength). In some embodiments, calibrating the sensor includes calibrating a characteristic of a sensor (e.g., sensitivity). In some embodiments, the calibration of 304 is performed to optimize the coverage and improve signal-tonoise transmission/detection of a signal (e.g., acoustic or ultrasonic) to be propagated through a medium and/or a disturbance to be detected. For example, one or more components of the system of FIG. 1 and/or the system of FIG. 2 are tuned to meet a signal-to-noise requirement. In some embodiments, the calibration of 304 depends on the size and type of a transmission/propagation medium and geometric configuration of the transmitters/sensors. In some embodiments, the calibration of step 304 includes detecting a failure or aging of a transmitter or sensor. In some embodiments, the calibration of step 304 includes cycling the transmitter and/or receiver. For example, to increase the stability and reliability of a piezoelectric transmitter and/or receiver, a burn-in cycle is performed using a burn-in signal. In some embodiments, the step of 304 includes configuring at least one sensing device within a vicinity of a predetermined spatial region to capture an indication associated with a disturbance using the sensing device. The disturbance is caused in a selected portion of the input signal corresponding to a selection portion of the predetermined spatial region.

At 306, surface disturbance detection is calibrated. In some embodiments, a test signal is propagated through a medium such as medium 102 of FIG. 1 to determine an expected sensed signal when no disturbance has been applied. In some embodiments, a test signal is propagated through a medium to determine a sensed signal when one or more predetermined disturbances (e.g., predetermined touch) are applied at a predetermined location. Using the sensed signal, one or more components may be adjusted to calibrate the disturbance detection. In some embodiments, the test signal is used to determine a signal that can be later used to process/filter a detected signal disturbed by a touch input.

In some embodiments, data determined using one or more steps of FIG. 3 is used to determine data (e.g., formula, variable, coefficients, etc.) that can be used to calculate an expected signal that would result when a touch input is provided at a specific location on a touch input surface. For example, one or more predetermined test touch disturbances are applied at one or more specific locations on the touch input surface and a test propagating signal that has been disturbed by the test touch disturbance is used to determine the data (e.g., transmitter/sensor parameters) that is to be used to calculate an expected signal that would result when a touch input is provided at the one or more specific locations.

At 308, a validation of a touch detection system is performed. For example, the system of FIG. 1 and/or FIG. 2 is testing using predetermined disturbance patterns to determine detection accuracy, detection resolution, multi-touch detection, and/or response time. If the validation fails, the process of FIG. 3 may be at least in part repeated and/or one or more components may be adjusted before performing another validation.

Figure 4:
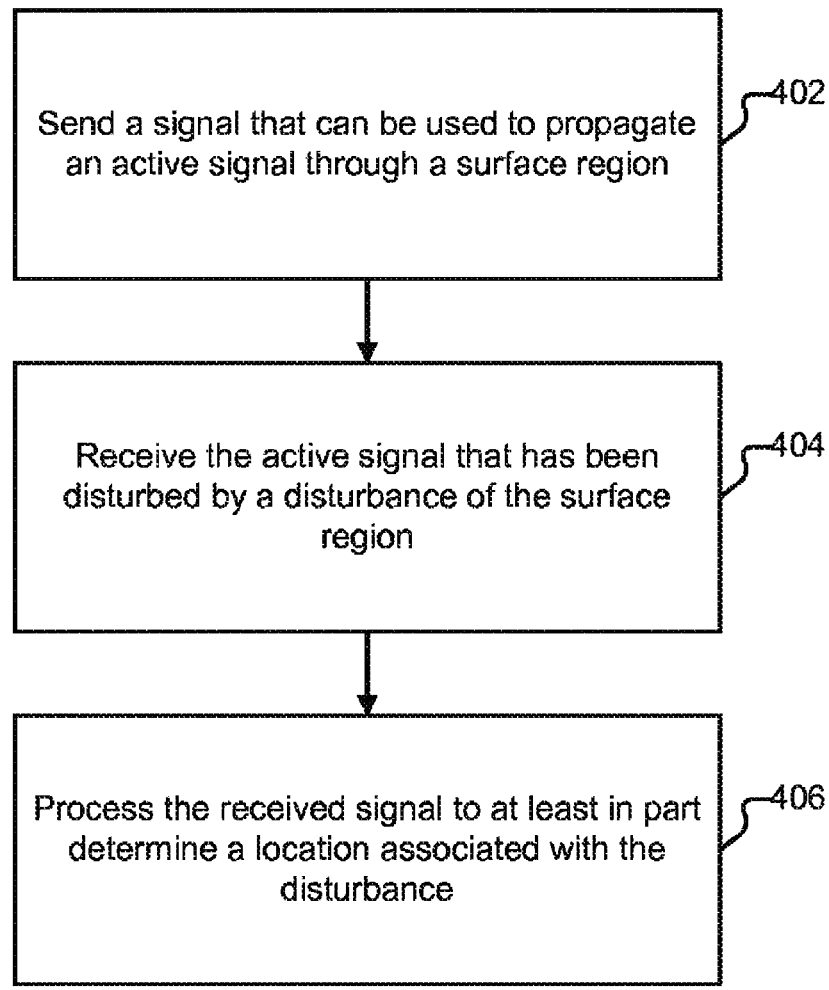
FIG. 4 is a flow chart illustrating an embodiment of a process for detecting a user touch input.

FIG. 4 is a flow chart illustrating an embodiment of a process for detecting a user touch input. In some embodiments, the process of FIG. 4 is at least in part implemented on touch detector 120 of FIG. 1 and/or touch detector 202 of FIG. 2.

At 402, a signal that can be used to propagate an active signal through a surface region is sent. In some embodiments, sending the signal includes driving (e.g., using driver 214 of FIG. 2) a transmitter such as a transducer (e.g., transmitter 104 of FIG. 1) to propagate an active signal (e.g., acoustic or ultrasonic mechanical wave) through a propagating medium with the surface region. In some embodiments, the signal includes a sequence selected to optimize autocorrelation (e.g., resulting in narrow/short peaks) of the signal. For example, the signal includes a Zadoff-Chu sequence. In some embodiments, the signal includes a pseudorandom binary sequence with or without modulation. In some embodiments, the propagated signal is an acoustic signal. In some embodiments, the propagated signal is an ultrasonic signal (e.g., outside the range of human hearing). For example, the propagated signal is a signal above 20 kHz (e.g., within the range between 80 kHz to 100 kHz). In other embodiments, the propagated signal may be within the range of human hearing. In some embodiments, by using the active signal, a user input on or near the surface region can be detected by detecting disturbances in the active signal when it is received by a sensor on the propagating medium. By using an active signal rather than merely listening passively for a user touch indication on the surface, other vibrations and disturbances that are not likely associated with a user touch indication can be more easily discerned/filtered out. In some embodiments, the active signal is used in addition to receiving a passive signal from a user input to determine the user input.

At 404, the active signal that has been disturbed by a disturbance of the surface region is received. The disturbance may be associated with a user touch indication. In some embodiments, the disturbance causes the active signal that is propagating through a medium to be attenuated and/or delayed. In some embodiments, the disturbance in a selected portion of the active signal corresponds to a location on the surface that has been indicated (e.g., touched) by a user.

At 406, the received signal is processed to at least in part determine a location associated with the disturbance. In some embodiments, receiving the received signal and processing the received signal are performed on a periodic interval. For example, the received signal is captured in 5 ms intervals and processed. In some embodiments, determining the location includes extracting a desired signal from the received signal at least in part by removing or reducing undesired components of the received signal such as disturbances caused by extraneous noise and vibrations not useful in detecting a touch input. In some embodiments, determining the location includes processing the received signal and comparing the processed received signal with a calculated expected signal associated with a hypothesis touch contact location to determine whether a touch contact was received at the hypothesis location of the calculated expected signal. Multiple comparisons may be performed with various expected signals associated with different hypothesis locations until the expected signal that best matches the processed received signal is found and the hypothesis location of the matched expected signal is identified as the touch contact location(s) of a touch input. For example, signals received by sensors (e.g., sensors 112, 114, 116, and 118 of FIG. 1) from various transmitters (e.g., transmitters 104, 106, 108, and 110 of FIG. 1) are compared with corresponding expected signals to determine a touch input location (e.g., single or multi-touch locations) that minimizes the overall difference between all respective received and expected signals.

The location, in some embodiments, is one or more locations (e.g., location coordinate(s)) on the surface region where a user has provided a touch contact. In addition to determining the location, one or more of the following information associated with the disturbance may be determined at 406: a gesture, simultaneous user indications (e.g., multi-touch input), a time, a status, a direction, a velocity, a force magnitude, a proximity magnitude, a pressure, a size, and other measurable or derived information. In some embodiments, the location is not determined at 406 if a location cannot be determined using the received signal and/or the disturbance is determined to be not associated with a user input. Information determined at 406 may be provided and/or outputted.

Although FIG. 4 shows receiving and processing an active signal that has been disturbed, in some embodiments, a received signal has not been disturbed by a touch input and the received signal is processed to determine that a touch input has not been detected. An indication that a touch input has not been detected may be provided/outputted.

Figure 5:
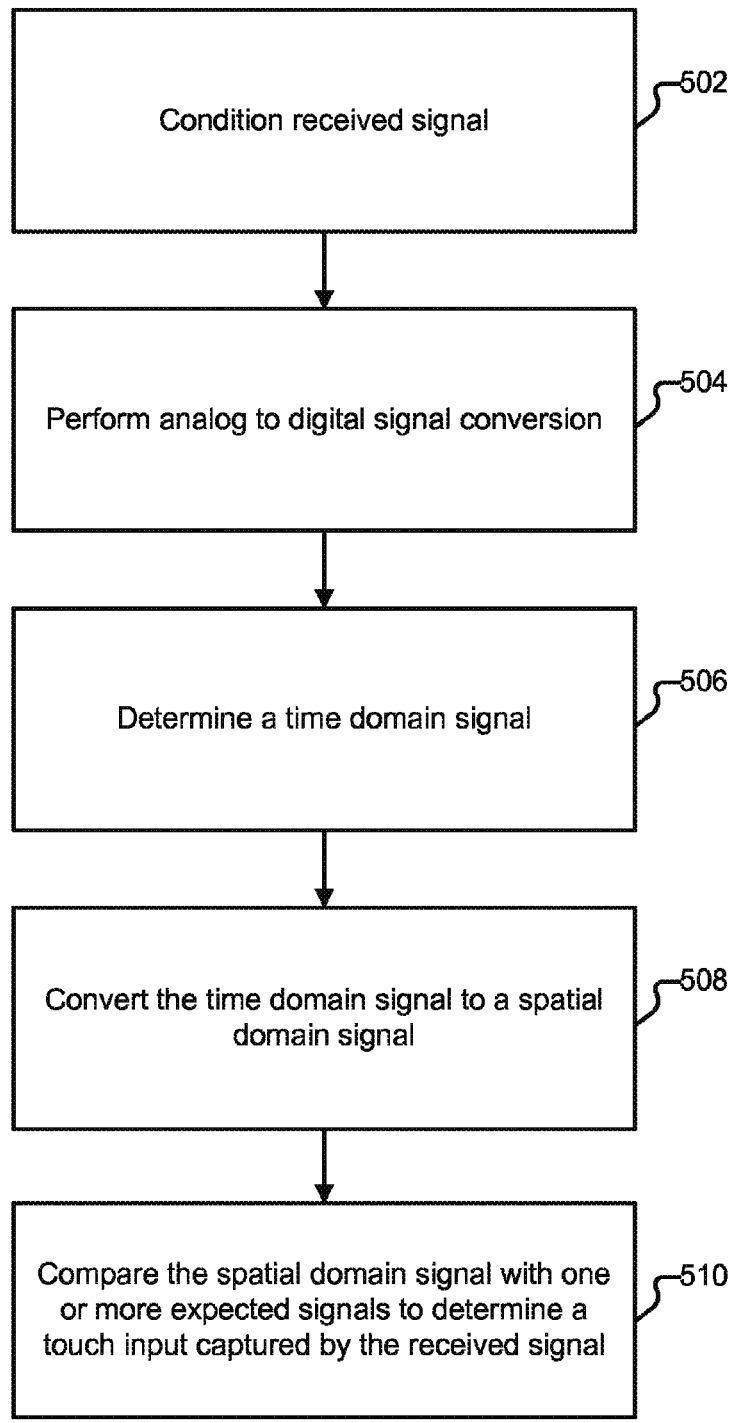
FIG. 5 is a flow chart illustrating an embodiment of a process for determining a location associated with a disturbance on a surface.

FIG. 5 is a flow chart illustrating an embodiment of a process for determining a location associated with a disturbance on a surface. In some embodiments, the process of FIG. 5 is included in 406 of FIG. 4. The process of FIG. 5 may be implemented in touch detector 120 of FIG. 1 and/or touch detector 202 of FIG. 2. In some embodiments, at least a portion of the process of FIG. 5 is repeated for each combination of transmitter and sensor pair. For example, for each active signal transmitted by a transmitter (e.g., transmitted by transmitter 104, 106, 108, or 110 of FIG. 1), at least a portion of the process of FIG. 5 is repeated for each sensor (e.g., sensors 112, 114, 116, and 118 of FIG. 1) receiving the active signal. In some embodiments, the process of FIG. 5 is performed periodically (e.g., 5 ms periodic interval).

At 502, a received signal is conditioned. In some embodiments, the received signal is a signal including a pseudorandom binary sequence that has been freely propagated through a medium with a surface that can be used to receive a user input. For example, the received signal is the signal that has been received at 404 of FIG. 4. In some embodiments, conditioning the signal includes filtering or otherwise modifying the received signal to improve signal quality (e.g., signal-to-noise ratio) for detection of a pseudorandom binary sequence included in the received signal and/or user touch input. In some embodiments, conditioning the received signal includes filtering out from the signal extraneous noise and/or vibrations not likely associated with a user touch indication.

At 504, an analog to digital signal conversion is performed on the signal that has been conditioned at 502. In various embodiments, any number of standard analog to digital signal converters may be used.

At 506, a time domain signal capturing a received signal time delay caused by a touch input disturbance is determined. In some embodiments, determining the time domain signal includes correlating the received signal (e.g., signal resulting from 504) to locate a time offset in the converted signal (e.g., perform pseudorandom binary sequence deconvolution) where a signal portion that likely corresponds to a reference signal (e.g., reference pseudorandom binary sequence that has been transmitted through the medium) is located. For example, a result of the correlation can be plotted as a graph of time within the received and converted signal (e.g., time-lag between the signals) vs. a measure of similarity. In some embodiments, performing the correlation includes performing a plurality of correlations. For example, a coarse correlation is first performed then a second level of fine correlation is performed. In some embodiments, a baseline signal that has not been disturbed by a touch input disturbance is removed in the resulting time domain signal. For example, a baseline signal (e.g., determined at 306 of FIG. 3) representing a measured signal (e.g., a baseline time domain signal) associated with a received active signal that has not been disturbed by a touch input disturbance is subtracted from a result of the correlation to further isolate effects of the touch input disturbance by removing components of the steady state baseline signal not affected by the touch input disturbance.

At 508, the time domain signal is converted to a spatial domain signal. In some embodiments, converting the time domain signal includes converting the time domain signal determined at 506 into a spatial domain signal that translates the time delay represented in the time domain signal to a distance traveled by the received signal in the propagating medium due to the touch input disturbance. For example, a time domain signal that can be graphed as time within the received and converted signal vs. a measure of similarity is converted to a spatial domain signal that can be graphed as distance traveled in the medium vs. the measure of similarity.

In some embodiments, performing the conversion includes performing dispersion compensation. For example, using a dispersion curve characterizing the propagating medium, time values of the time domain signal are translated to distance values in the spatial domain signal. In some embodiments, a resulting curve of the time domain signal representing a distance likely traveled by the received signal due to a touch input disturbance is narrower than the curve contained in the time domain signal representing the time delay likely caused by the touch input disturbance. In some embodiments, the time domain signal is filtered using a match filter to reduce undesired noise in the signal. For example, using a template signal that represents an ideal shape of a spatial domain signal, the converted spatial domain signal is match filtered (e.g., spatial domain signal correlated with the template signal) to reduce noise not contained in the bandwidth of the template signal. The template signal may be predetermined (e.g., determined at 306 of FIG. 3) by applying a sample touch input to a touch input surface and measuring a received signal.

At 510, the spatial domain signal is compared with one or more expected signals to determine a touch input captured by the received signal. In some embodiments, comparing the spatial domain signal with the expected signal includes generating expected signals that would result if a touch contact was received at hypothesis locations. For example, a hypothesis set of one or more locations (e.g., single touch or multi-touch locations) where a touch input might have been received on a touch input surface is determined, and an expected spatial domain signal that would result at 508 if touch contacts were received at the hypothesis set of location(s) is determined (e.g., determined for a specific transmitter and sensor pair using data measured at 306 of FIG. 3). The expected spatial domain signal may be compared with the actual spatial signal determined at 508. The hypothesis set of one or more locations may be one of a plurality of hypothesis sets of locations (e.g., exhaustive set of possible touch contact locations on a coordinate grid dividing a touch input surface).

The proximity of location(s) of a hypothesis set to the actual touch contact location(s) captured by the received signal may be proportional to the degree of similarity between the expected signal of the hypothesis set and the spatial signal determined at 508. In some embodiments, signals received by sensors (e.g., sensors 112, 114, 116, and 118 of FIG. 1) from transmitters (e.g., transmitters 104, 106, 108, and 110 of FIG. 1) are compared with corresponding expected signals for each sensor/transmitter pair to select a hypothesis set that minimizes the overall difference between all respective detected and expected signals. In some embodiments, once a hypothesis set is selected, another comparison between the determined spatial domain signals and one or more new expected signals associated with finer resolution hypothesis touch location(s) (e.g., locations on a new coordinate grid with more resolution than the coordinate grid used by the selected hypothesis set) near the location(s) of the selected hypothesis set is determined.

Figure 6:
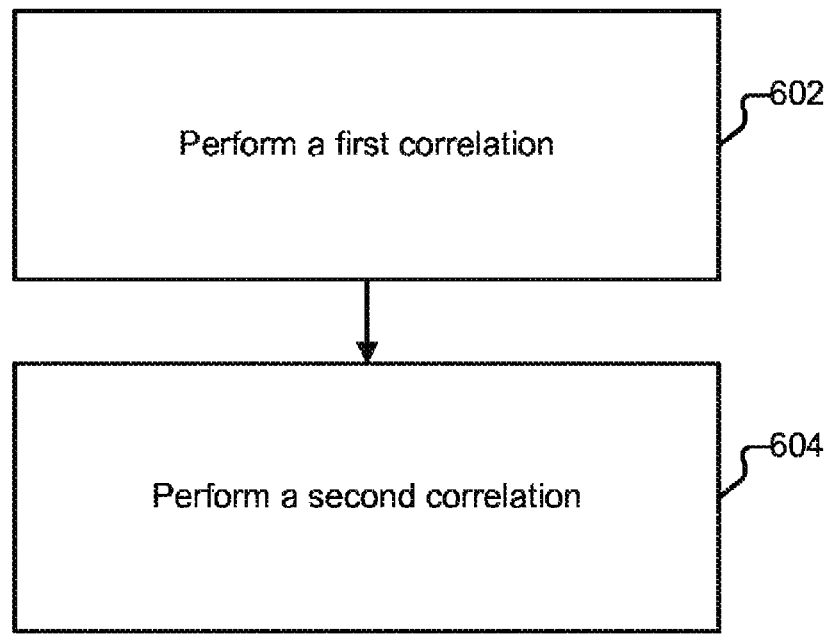
FIG. 6 is a flow chart illustrating an embodiment of a process for determining time domain signal capturing of a disturbance caused by a touch input.

FIG. 6 is a flow chart illustrating an embodiment of a process for determining time domain signal capturing of a disturbance caused by a touch input. In some embodiments, the process of FIG. 6 is included in 506 of FIG. 5. The process of FIG. 6 may be implemented in touch detector 120 of FIG. 1 and/or touch detector 202 of FIG. 2.

At 602, a first correlation is performed. In some embodiments, performing the first correlation includes correlating a received signal (e.g., resulting converted signal determined at 504 of FIG. 5) with a reference signal. Performing the correlation includes cross-correlating or determining a convolution (e.g., interferometry) of the converted signal with a reference signal to measure the similarity of the two signals as a time-lag is applied to one of the signals. By performing the correlation, the location of a portion of the converted signal that most corresponds to the reference signal can be located. For example, a result of the correlation can be plotted as a graph of time within the received and converted signal (e.g., time-lag between the signals) vs. a measure of similarity. The associated time value of the largest value of the measure of similarity corresponds to the location where the two signals most correspond. By comparing this measured time value against a reference time value (e.g., at 306 of FIG. 3) not associated with a touch indication disturbance, a time delay/offset or phase difference caused on the received signal due to a disturbance caused by a touch input can be determined. In some embodiments, by measuring the amplitude/intensity difference of the received signal at the determined time vs. a reference signal, a force associated with a touch indication may be determined. In some embodiments, the reference signal is determined based at least in part on the signal that was propagated through a medium (e.g., based on a source pseudorandom binary sequence signal that was propagated). In some embodiments, the reference signal is at least in part determined using information determined during calibration at 306 of FIG. 3. The reference signal may be chosen so that calculations required to be performed during the correlation may be simplified. For example, the reference signal is a simplified reference signal that can be used to efficiently correlate the reference signal over a relatively large time difference (e.g., lag-time) between the received and converted signal and the reference signal.

At 604, a second correlation is performed based on a result of the first correlation. Performing the second correlation includes correlating (e.g., cross-correlation or convolution similar to step 602) a received signal (e.g., resulting converted signal determined at 504 of FIG. 5) with a second reference signal. The second reference signal is a more complex/detailed (e.g., more computationally intensive) reference signal as compared to the first reference signal used in 602. In some embodiments, the second correlation is performed because using the second reference signal in 602 may be too computationally intensive for the time interval required to be correlated in 602. Performing the second correlation based on the result of the first correlation includes using one or more time values determined as a result of the first correlation. For example, using a result of the first correlation, a range of likely time values (e.g., time-lag) that most correlate between the received signal and the first reference signal is determined and the second correlation is performed using the second reference signal only across the determined range of time values to fine tune and determine the time value that most corresponds to where the second reference signal (and, by association, also the first reference signal) matched the received signal. In various embodiments, the first and second correlations have been used to determine a portion within the received signal that corresponds to a disturbance caused by a touch input at a location on a surface of a propagating medium. In other embodiments, the second correlation is optional. For example, only a single correlation step is performed. Any number of levels of correlations may be performed in other embodiments.

Figure 7:
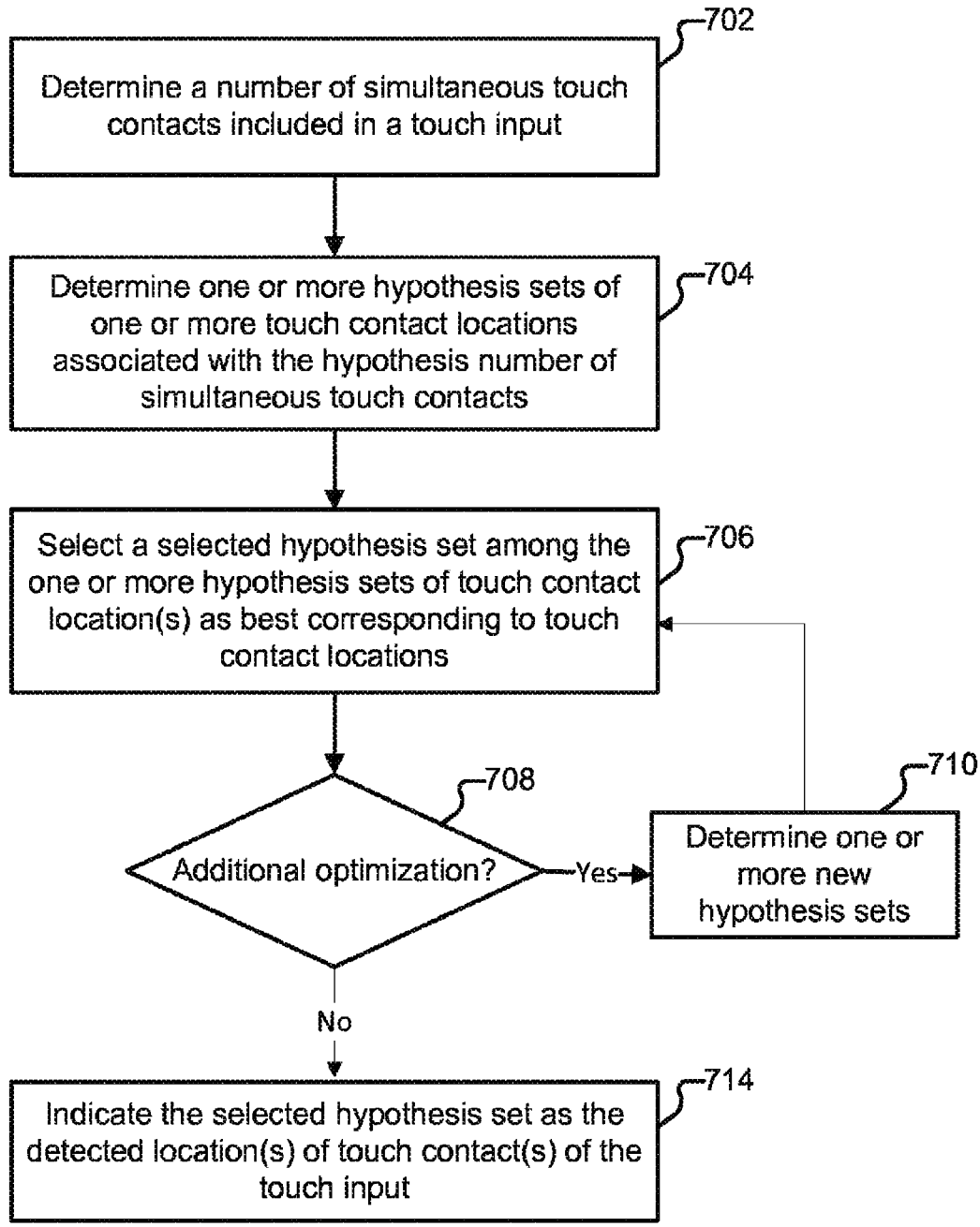
FIG. 7 is a flow chart illustrating an embodiment of a process comparing spatial domain signals with one or more expected signals to determine touch contact location(s) of a touch input.

FIG. 7 is a flow chart illustrating an embodiment of a process comparing spatial domain signals with one or more expected signals to determine touch contact location(s) of a touch input. In some embodiments, the process of FIG. 7 is included in 510 of FIG. 5. The process of FIG. 7 may be implemented in touch detector 120 of FIG. 1 and/or touch detector 202 of FIG. 2.

At 702, a number of simultaneous touch contacts included in a touch input is determined. In some embodiments, when detecting a location of a touch contact, the number of simultaneous contacts being made to a touch input surface (e.g., surface of medium 102 of FIG. 1) is desired to be determined. For example, it is desired to determine the number of fingers touching a touch input surface (e.g., single touch or multi-touch). In some embodiments, an identifier of the number of simultaneous touch contacts is received from acoustic processor 126 of FIG. 1. In some embodiments, the number of touch contacts (e.g., fingers) touching a touch input surface may be determined by "counting" the number of touches/contacts (e.g., determine the number of times detected acoustic signal is above a threshold level) detected by an acoustic sensor within a predetermined amount of time. For example, when a user intends to touch a touch input screen with multiple fingers at the same time, it is rare for the fingers to land on the screen at the same time. There will likely be a small delay between when the fingers land on the touch surface. The number of impacts (e.g., determined by analyzing acoustic signal received from sensor 124 of FIG. 1) may be determined from determining the number of consecutive touches within a relatively short amount of time (e.g., within a predetermined amount of time).

At 704, one or more hypothesis sets of one or more touch contact locations associated with the determined number of simultaneous touch contacts are determined. In some embodiments, it is desired to determine the coordinate locations of fingers touching a touch input surface. In some embodiments, in order to determine the touch contact locations, one or more hypothesis sets are determined on potential location(s) of touch contact(s) and each hypothesis set is tested to determine which hypothesis set is most consistent with a detected data.

In some embodiments, determining the hypothesis set of potential touch contact locations includes dividing a touch input surface into a constrained number of points (e.g., divide into a coordinate grid) where a touch contact may be detected. For example, in order to initially constrain the number of hypothesis sets to be tested, the touch input surface is divided into a coordinate grid with relatively large spacing between the possible coordinates. Each hypothesis set includes a number of location identifiers (e.g., location coordinates) that match the number determined in 702. For example, if two was determined to be the number in 702, each hypothesis set includes two location coordinates on the determined coordinate grid that correspond to potential locations of touch contacts of a received touch input. In some embodiments, determining the one or more hypothesis sets includes determining exhaustive hypothesis sets that exhaustively cover all possible touch contact location combinations on the determined coordinate grid for the determined number of simultaneous touch contacts. In some embodiments, a previously determined touch contact location(s) of a previous determined touch input is initialized as the touch contact location(s) of a hypothesis set.

At 706, a selected hypothesis set is selected among the one or more hypothesis sets of touch contact location(s) as best corresponding to touch contact locations captured by detected signal(s). In some embodiments, one or more propagated active signals (e.g., signal transmitted at 402 of FIG. 4) that have been disturbed by a touch input on a touch input surface are received (e.g., received at 404 of FIG. 4) by one or more sensors such as sensors 112, 114, 116, and 118 of FIG. 1. Each active signal transmitted from each transmitter (e.g., different active signals each transmitted by transmitters 104, 106, 108, and 110 of FIG. 1) is received by each sensor (e.g., sensors 112, 114, 116, and 118 of FIG. 1) and may be processed to determine a detected signal (e.g., spatial domain signal determined at 508 of FIG. 5) that characterizes a signal disturbance caused by the touch input. In some embodiments, for each hypothesis set of touch contact location(s), an expected signal is determined for each signal expected to be received at one or more sensors. The expected signal may be determined using a predetermined function that utilizes one or more predetermined coefficients (e.g., coefficient determined for a specific sensor and/or transmitter transmitting a signal to be received at the sensor) and the corresponding hypothesis set of touch contact location(s). The expected signal(s) may be compared with corresponding detected signal(s) to determine an indicator of a difference between all the expected signal(s) for a specific hypothesis set and the corresponding detected signals. By comparing the indicators for each of the one or more hypothesis sets, the selected hypothesis set may be selected (e.g., hypothesis set with the smallest indicated difference is selected).

At 708, it is determined whether additional optimization is to be performed. In some embodiments, determining whether additional optimization is to be performed includes determining whether any new hypothesis set(s) of touch contact location(s) should be analyzed in order to attempt to determine a better selected hypothesis set. For example, a first execution of step 706 utilizes hypothesis sets determined using locations on a larger distance increment coordinate grid overlaid on a touch input surface and additional optimization is to be performed using new hypothesis sets that include locations from a coordinate grid with smaller distance increments. Additional optimizations may be performed any number of times. In some embodiments, the number of times additional optimizations are performed is predetermined. In some embodiments, the number of times additional optimizations are performed is dynamically determined. For example, additional optimizations are performed until a comparison threshold indicator value for the selected hypothesis set is reached and/or a comparison indicator for the selected hypothesis does not improve by a threshold amount. In some embodiments, for each optimization iteration, optimization may be performed for only a single touch contact location of the selected hypothesis set and other touch contact locations of the selected hypothesis may be optimized in a subsequent iteration of optimization.

If at 708 it is determined that additional optimization should be performed, at 710, one or more new hypothesis sets of one or more touch contact locations associated with the number of the touch contacts are determined based on the selected hypothesis set. In some embodiments, determining the new hypothesis sets includes determining location points (e.g., more detailed resolution locations on a coordinate grid with smaller distance increments) near one of the touch contact locations of the selected hypothesis set in an attempt to refine the one of the touch contact locations of the selected hypothesis set. The new hypothesis sets may each include one of the newly determined location points, and the other touch contact location(s), if any, of a new hypothesis set may be the same locations as the previously selected hypothesis set. In some embodiments, the new hypothesis sets may attempt to refine all touch contact locations of the selected hypothesis set. The process proceeds back to 706, whether or not a newly selected hypothesis set (e.g., if previously selected hypothesis set still best corresponds to detected signal(s), the previously selected hypothesis set is retained as the new selected hypothesis set) is selected among the newly determined hypothesis sets of touch contact location(s).

If at 708 it is determined that additional optimization should not be performed, at 714, the selected hypothesis set is indicated as the detected location(s) of touch contact(s) of the touch input. For example, a location coordinate(s) of a touch contact(s) is provided.

Figure 8:
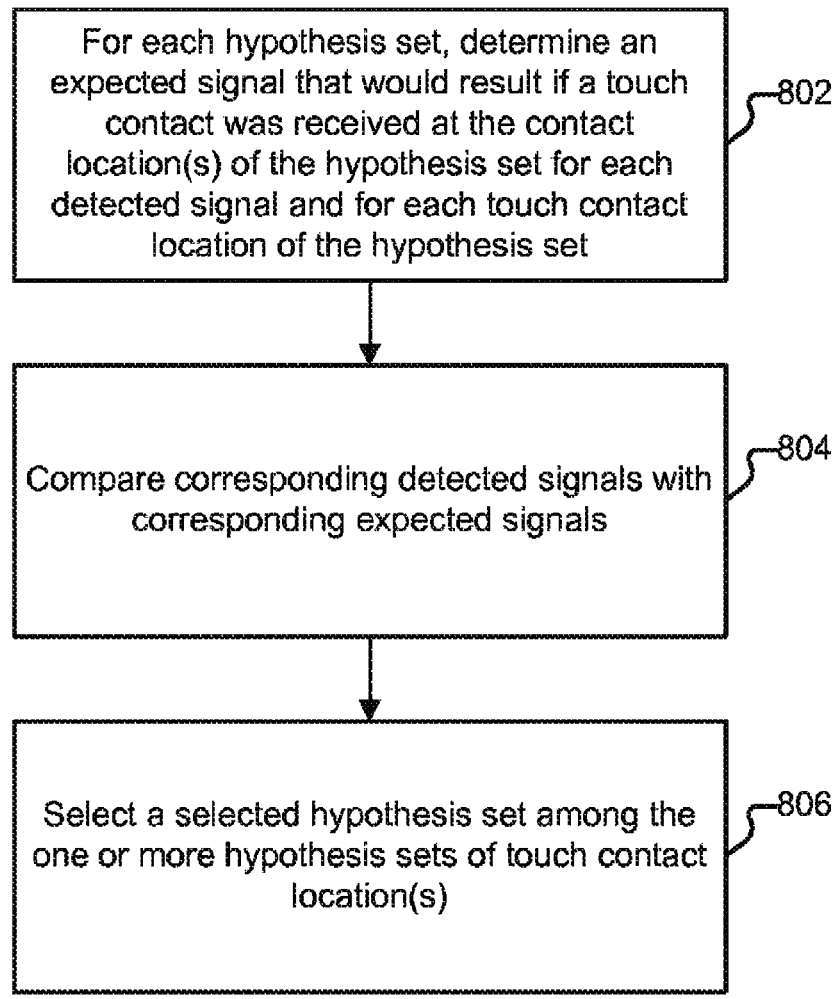
FIG. 8 is a flowchart illustrating an embodiment of a process for selecting a selected hypothesis set of touch contact location(s).

FIG. 8 is a flowchart illustrating an embodiment of a process for selecting a selected hypothesis set of touch contact location(s). In some embodiments, the process of FIG. 8 is included in 706 of FIG. 7. The process of FIG. 8 may be implemented in touch detector 120 of FIG. 1 and/or touch detector 202 of FIG. 2.

At 802, for each hypothesis set (e.g., determined at 704 of FIG. 7), an expected signal that would result if a touch contact was received at the contact location(s) of the hypothesis set is determined for each detected signal and for each touch contact location of the hypothesis set. In some embodiments, determining the expected signal includes using a function and one or more function coefficients to generate/simulate the expected signal. The function and/or one or more function coefficients may be predetermined (e.g., determined at 306 of FIG. 3) and/or dynamically determined (e.g., determined based on one or more provided touch contact locations). In some embodiments, the function and/or one or more function coefficients may be determined/selected specifically for a particular transmitter and/or sensor of a detected signal. For example, the expected signal is to be compared to a detected signal and the expected signal is generated using a function coefficient determined specifically for the pair of transmitter and sensor of the detected signal. In some embodiments, the function and/or one or more function coefficients may be dynamically determined.

In some embodiments, in the event the hypothesis set includes more than one touch contact location (e.g., multi-touch input), expected signal for each individual touch contact location is determined separately and combined together. For example, an expected signal that would result if a touch contact was provided at a single touch contact location is added with other single touch contact expected signals (e.g., effects from multiple simultaneous touch contacts add linearly) to generate a single expected signal that would result if the touch contacts of the added signals were provided simultaneously.

In some embodiments, the expected signal for a single touch contact is modeled as the function:

$$C*P(x-d)$$

where C is a function coefficient (e.g., complex coefficient) and P(x) is a function and d is the total path distance between a transmitter (e.g., transmitter of a signal desired to be simulated) to a touch input location and between the touch input location and a sensor (e.g., receiver of the signal desired to be simulated).

In some embodiments, the expected signal for one or more touch contacts is modeled as the function:

$$\sum_{j=1}^{N} C_j P(x - d_j)$$

where j indicates which touch contact and N is the number of total simultaneous touch contacts being modeled (e.g., number of contacts determined at 702 of FIG. 7).

At 804, corresponding detected signals are compared with corresponding expected signals. In some embodiments, the detected signals include spatial domain signals determined at 508 of FIG. 5. In some embodiments, comparing the signals includes determining a mean square error between the signals. In some embodiments, comparing the signals includes determining a cost function that indicates the similarly/difference between the signals. In some embodiments, the cost function for a hypothesis set (e.g., hypothesis set determined at 704 of FIG. 7) analyzed for a single transmitter/sensor pair is modeled as:

$$\varepsilon(r_x, t_x) = \left| q(x) - \sum_{j=1}^{N} C_j P(x - d_j) \right|^2$$

where $\varepsilon(r_x, t_x)$ is the cost function, $q(x)$ is the detected signal, and $\sum_{j=1}^{N} C_j P(x-d_j)$ is the expected signal. In some embodiments, the global cost function for a hypothesis set analyzed for more than one (e.g., all) transmitter/sensor pair is modeled as:

$$\varepsilon = \sum_{i=1}^{Z} \varepsilon(r_x, t_x)_i$$

where $\varepsilon$ is the global cost function, Z is the number of total transmitter/sensor pairs, i indicates the particular transmitter/sensor pair, and $\varepsilon(r_x,t_x)_i$ is the cost function of the particular transmitter/sensor pair.

At 806, a selected hypothesis set of touch contact location(s) is selected among the one or more hypothesis sets of touch contact location(s) as best corresponding to detected signal(s). In some embodiments, the selected hypothesis set is selected among hypothesis sets determined at 704 or 710 of FIG. 7. In some embodiments, selecting the selected hypothesis set includes determining the global cost function (e.g., function $\varepsilon$ described above) for each hypothesis set in the group of hypothesis sets and selecting the hypothesis set that results in the smallest global cost function value.

Figure 9:
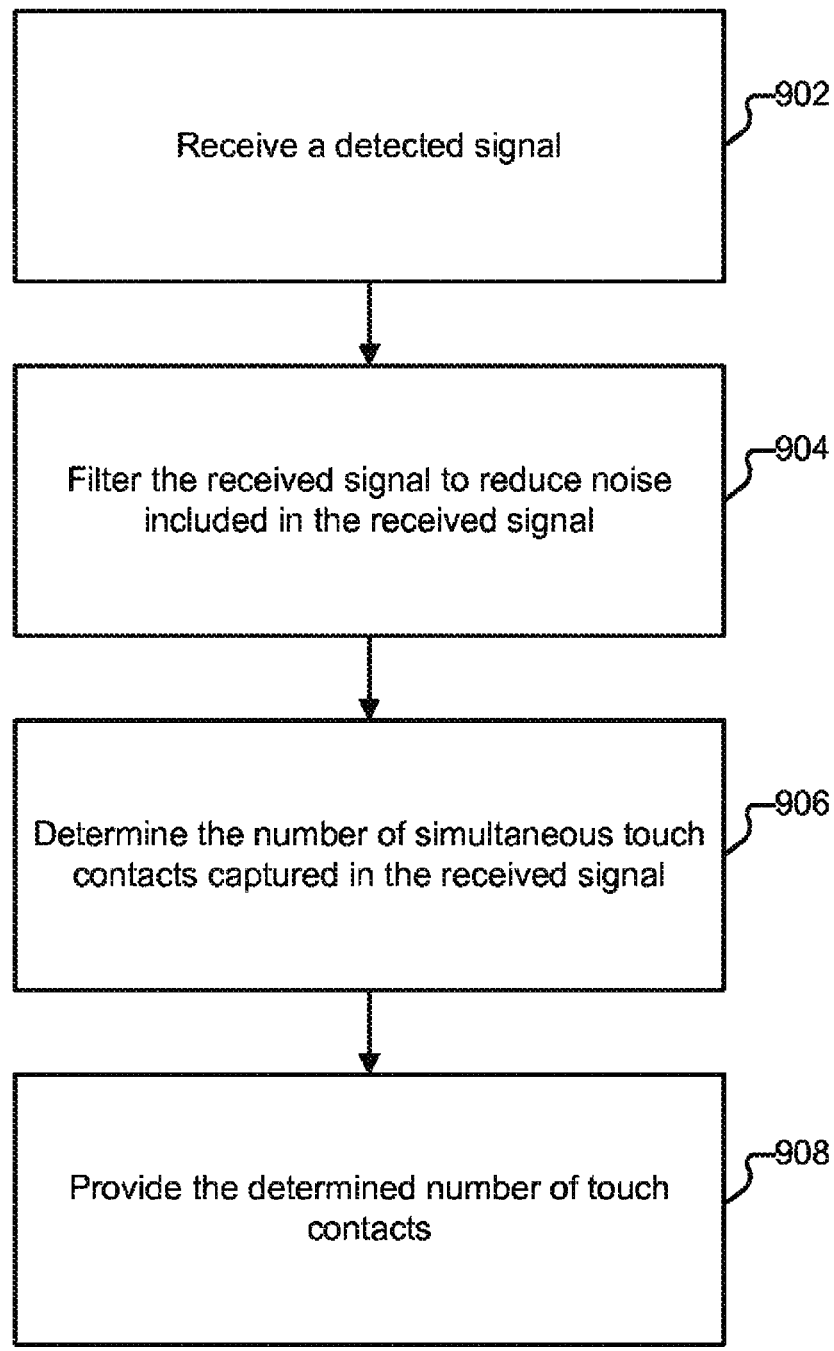
FIG. 9 is a flow chart illustrating an embodiment of a process for determining the number of simultaneous touch contacts.

FIG. 9 is a flow chart illustrating an embodiment of a process for determining the number of simultaneous touch contacts. In some embodiments, the process of FIG. 9 is included in 702 of FIG. 7. The process of FIG. 9 may be implemented on acoustic processor 126 and/or touch detector 120 of FIG. 1.

At 902, a detected signal is received. The detected signal may be an acoustic signal. In some embodiments, the acoustic signal captures a sound/vibration generated due to one or more objects contacting a touch input surface such as the surface of medium 102 of FIG. 1. In some embodiments, the detected signal is received from sensor 124 of FIG. 1. In some embodiments, the detected signal is received from one or more sensors of sensors 112, 114, 116 and 118. The received signal may be an ultrasonic signal. In some embodiments, the detected signal includes the disturbed active signal received at 404 of FIG. 4.

At 904, the received signal is filtered to reduce noise included in the received acoustic signal. In some embodiments, background audio, such as human speech or music, could potentially create false contact events without proper filtering and/or pulse qualification. In some embodiments, a rate of spectral change of a portion of the received signal is measured. For example, by exploiting the observation that background noise can be viewed as statistically stationary over the span of tens of milliseconds, signal portions with a relative lower rate of spectral change are identified as background noise not capturing a touch contact event. In some embodiments, a fast Fourier transform of the received acoustic signal is determined over a short time extent (e.g., less than 10 milliseconds). If a signal portion with a slow change is detected (e.g., below a threshold value), the signal portion is reduced and/or removed to filter the received signal. In some embodiments, filtering the received signal is optional. In some embodiments, filtering the received signal includes removing/reducing one or more components of an active signal included in the received signal. For example, a baseline signal (e.g., determined at 306 of FIG. 3) representing a measured signal associated with a received active signal that has not been disturbed by a touch input disturbance is subtracted from the received detected acoustic signal.

At 906, a number of simultaneous (e.g., within a threshold amount of time) touch contacts captured in the received signal is determined. In some embodiments, the number of touch contacts (e.g., fingers) touching a touch input surface may be determined by "counting" the number of touches/contacts (e.g., determine the number of times detected acoustic signal is above a threshold level) within a predetermined amount of time. For example, when a user intends to touch a touch input screen with multiple fingers at the same time, it is rare for the fingers to land on the screen at the same time. There will likely be a small delay between when the fingers land on the touch surface. The number of impacts (e.g., determined by analyzing acoustic signal received from sensor 124 of FIG. 1) may be determined from determining the number of consecutive touches within a relatively short amount of time (e.g., within a predetermined amount of time, such as 100 milliseconds). In some embodiments, determining the number of touch contacts includes determining the number of times the energy of the filtered/received signal is above a threshold energy value within a predetermined amount of time. In some embodiments, determining the number of touch contacts includes determining the number of times a rate of spectral change of the filtered/received signal is above a threshold value within a predetermined amount of time. For example, a fast Fourier transform of the received acoustic signal is determined to determine the rate of spectral change.

At 908, the determined number of touch contacts is provided. In some embodiments, the number determined at 906 is provided to a process (e.g., provided at step 702 of FIG. 7) that determines touch contact locations of a touch input.

Figure 10:
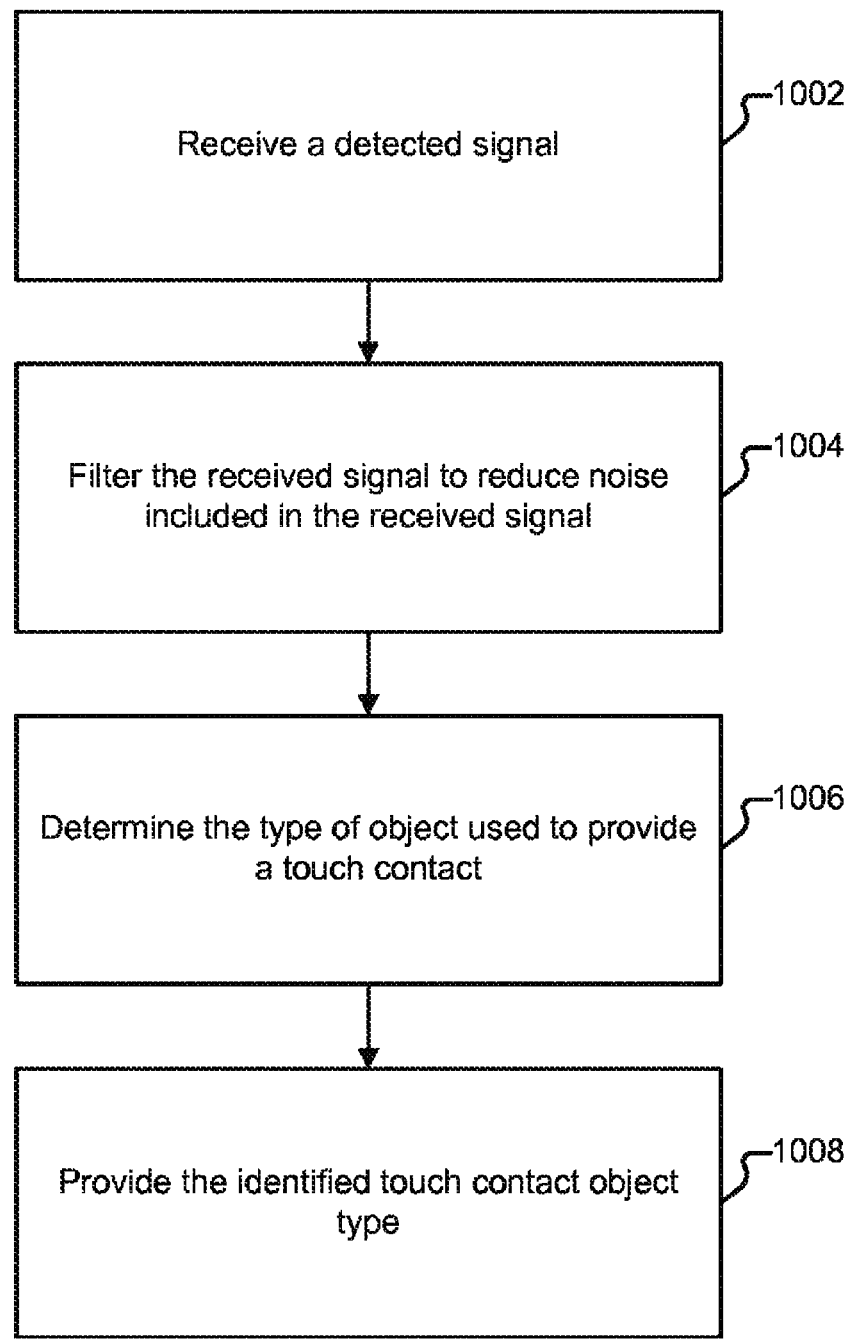
FIG. 10 is a flow chart illustrating an embodiment of a process for determining a type of object used to provide a touch contact.

FIG. 10 is a flow chart illustrating an embodiment of a process for determining a type of object used to provide a touch contact. In some embodiments, the process of FIG. 10 is included in 702 of FIG. 7. The process of FIG. 10 may be implemented on acoustic processor 126 and/or touch detector 120 of FIG. 1.

At 1002, a detected signal is received. The detected signal may be an acoustic signal. In some embodiments, the acoustic signal captures a sound/vibration generated due to one or more objects contacting a touch input surface such as the surface of medium 102 of FIG. 1. In some embodiments, the detected signal is received from sensor 124 of FIG. 1. In some embodiments, the detected signal is received from one or more sensors of sensors 112, 114, 116 and 118. The received signal may be an ultrasonic signal. In some embodiments, the detected signal includes the disturbed active signal received at 404 of FIG. 4.

At 1004, the received signal is filtered to reduce noise included in the received signal. In some embodiments, background audio, such as human speech or music, could potentially create false contact events without proper filtering. In some embodiments, a rate of spectral change of a portion of the received signal is measured. For example, by exploiting the observation that background noise can be viewed as statistically stationary over the span of tens of milliseconds, signal portions with a relative lower rate of spectral change are identified as background noise not capturing a touch contact event. In some embodiments, a fast Fourier transform of the received acoustic signal is determined over a short time extent (e.g., less than 10 milliseconds). If a signal component with a slow change is detected (e.g., below a threshold value), the signal portion is reduced and/or removed to filter the received signal. In some embodiments, filtering the received signal is optional. In some embodiments, filtering the received signal includes removing/reducing one or more components of an active signal included in the received signal. For example, a baseline signal (e.g., determined at 306 of FIG. 3) representing a measured signal associated with a received active signal that has not been disturbed by a touch input disturbance is subtracted from the received detected acoustic signal.

At 1006, a type of object used to provide a touch contact is determined. In some embodiments, determining the type of object includes determining whether the touch contact of a touch input was provided using a finger (e.g., which finger), a stylus (e.g., which stylus or tip of stylus), or other detectable object. In some embodiments, determining the type of object includes analyzing an energy/signal captured in the received/filtered signal due to the touch contact of the object on a touch input surface. In some embodiments, portion(s) of the received/filtered signal that are each associated with a touch contact are identified. For example, using at least a portion of the process of FIG. 9, portion(s) of the received signal corresponding to each touch contact are identified and for each touch contact a type of object used to provide the touch contact is determined.

In some embodiments, at least a portion of the received/filtered signal corresponding to a touch input contact is analyzed to determine whether it matches a known signature (e.g., acoustic signature waveform) of a known object type. For example, a finger touching a touch input surface may be characterized by a different detected acoustic signature as compared to a harder object such as a pen or a stylus. A different waveform signature associated with each detectable object type may be compared to at least a portion of the received/filtered signal to determine the type of the object contacting the touch input surface. In some embodiments, the object type waveform signatures are predetermined and stored in a dictionary/data structure. For example, for each object type desired to be detectable, a sample signal of the object contacting a sample touch input surface is captured and characterized as the object type waveform signature of the object. If at least a portion of the received/filtered signature matches (e.g., within a threshold difference) one of the predetermined signatures, an object type associated with the matched signature is identified as the object type of the portion of the received/filtered signal.

In some embodiments, determining the object type of the touch contact includes feature matching in the time domain by correlating a waveform of at least a portion of the received/filtered signal against a known "dictionary" of waveforms from contact events. In some embodiments, determining the object type of the touch contact includes frequency-domain matching of at least a portion of the received/filtered signal against a known "dictionary" of frequency-domain spectra from contact events. In some embodiments, determining the object type of the touch contact includes wavelet-domain matching of at least a portion of the received/filtered signal against a known "dictionary" of wavelet-domain transforms from contact events.

At 1008, the identified touch contact object type is provided. In some embodiments, the type determined at 1006 is provided to an application (e.g., to application system 122) to provide an interaction/functionality based on the identified object type. In some embodiments, differentiation between a stylus or pen contact versus a human finger can be used to initiate different behaviors on a device. For example, detection of a stylus contact may invoke handwriting detection on an application.

Figure 11:
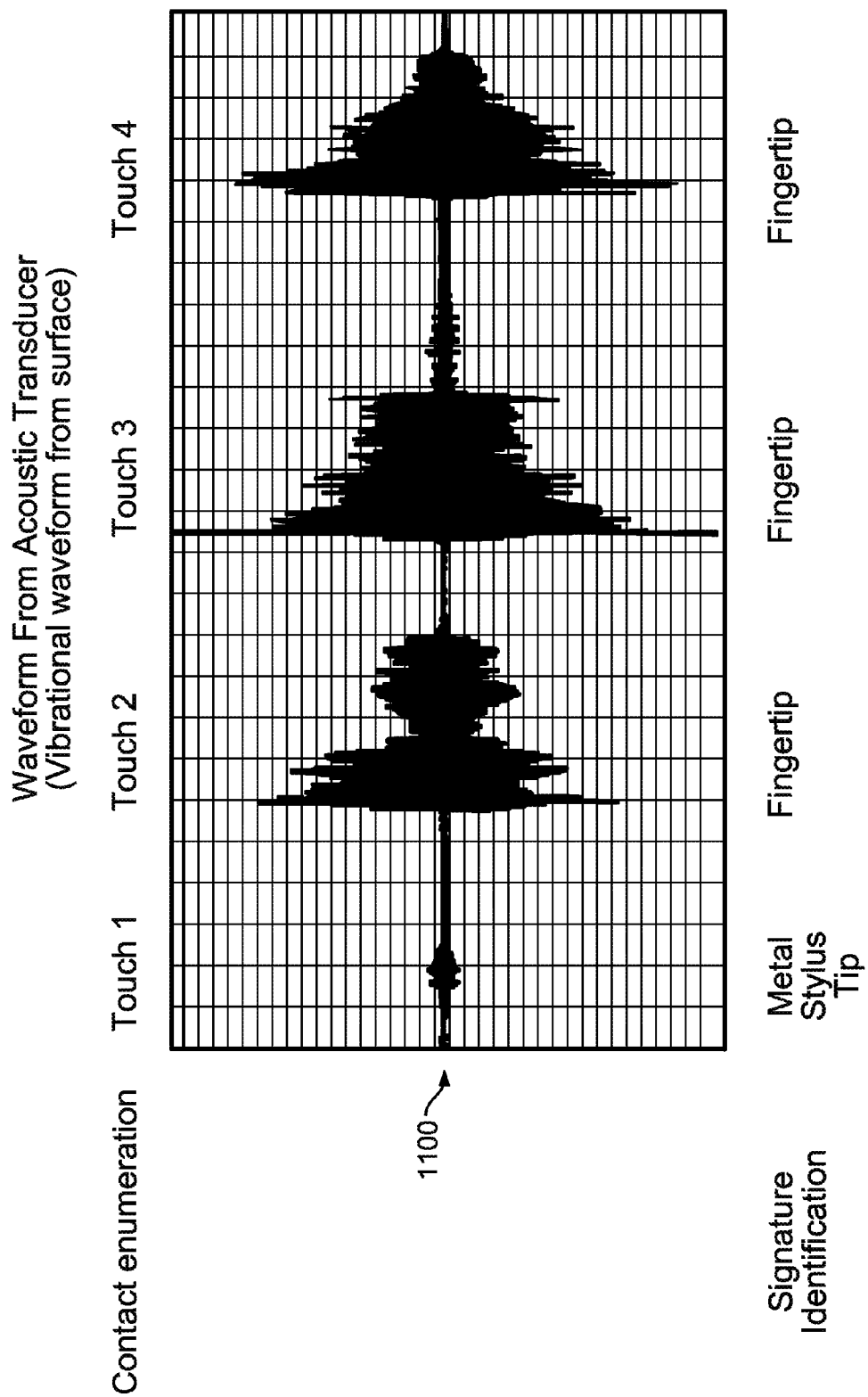
FIG. 11 shows a waveform diagram of an example received/filtered signal that has been identified with touch contact object types.

FIG. 11 shows a waveform diagram of an example received/filtered signal that has been identified with touch contact object types. Waveform 1100 shows four touch contacts that have been identified (e.g., using the process of FIG. 9) and type identified (e.g., using the process of FIG. 10) with the object type that provided the touch contact. As shown in FIG. 11, the waveforms of the fingertip touch contact vs. a metal stylus tip touch contact are distinctly different and may be identified using corresponding touch input object type acoustic waveform signatures.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface configured to:
send a sent signal to be used to propagate a freely propagating signal through a propagating medium with a touch input surface, wherein the freely propagating signal has been allowed to freely propagate through the propagating medium in a plurality directions to a plurality of receivers on multiple axes of the propagating medium; and
receive a received signal detected due to a touch input object contacting the touch input surface, wherein the received signal includes the freely propagating signal that has been disturbed by the touch input object; and a processor coupled with the communication interface and configured to:
  compare at least a portion of the received signal with one or more reference signals of one or more touch input object types, wherein comparing at least the portion of the received signal with the one or more reference signals of the one or more touch input object types includes comparing a portion of the freely propagating signal that has been disturbed by the touch input object with the one or more reference signals of the one or more touch input object types; and
  determine based at least in part on the comparison a location of the touch input object contacting the surface.

2. The system of claim 1, wherein the received signal was detected by a transducer.

3. The system of claim 1, wherein comparing at least the portion of the received signal with the one or more reference signals includes matching in a time domain by correlating the at least a portion of the received signal with one or more waveforms of the one or more reference signals.

4. The system of claim 1, wherein comparing at least the portion of the received signal with the one or more reference signals includes frequency-domain matching at least a portion of the received signal with one or more frequency-domain spectra of the one or more reference signals.

5. The system of claim 1, wherein comparing at least the portion of the received signal with the one or more reference signals includes wavelet-domain matching at least a portion of the received signal with one or more wavelet-domain transforms of the one or more reference signals.

6. The system of claim 1, wherein the received signal was detected by converting a detected vibrational energy to the received signal.

7. The system of claim 1, wherein one or more components of the system are powered down while awaiting to receive the received signal detected due to the touch input object contacting the touch input surface.

8. The system of claim 1, wherein comparing at least the portion of the received signal with the one or more reference signals includes comparing a predetermined amount of time of the received signal with the one or more reference signals.

9. The system of claim 1, wherein the processor is further configured to filter a background noise included in the received signal.

10. The system of claim 9, wherein filtering the background noise includes measuring a rate of spectral change of at least a portion of the received signal.

11. The system of claim 10, wherein measuring the rate of spectral change includes computing a fast Fourier transform of at least a portion of the received signal.

12. The system of claim 1, wherein the received signal includes an acoustic signal.

13. A method, comprising:
  sending a sent signal to be used to propagate a freely propagating signal through a propagating medium with a touch input surface, wherein the freely propagating signal has been allowed to freely propagate through the propagating medium in a plurality directions to a plurality of receivers on multiple axes of the propagating medium; and
  receiving a received signal detected due to a touch input object contacting the touch input surface, wherein the received signal includes the freely propagating signal that has been disturbed by the touch input object;
  using a processor to compare at least a portion of the received signal with one or more reference signals of one or more touch input object types, wherein comparing at least the portion of the received signal with the one or more reference signals of the one or more touch input object types includes comparing a portion of the freely propagating signal that has been disturbed by the touch input object with the one or more reference signals of the one or more touch input object types; and
  determining based at least in part on the comparison a location of the touch input object contacting the surface.

14. The method of claim 13, wherein the received signal was detected by a transducer.

15. The method of claim 13, wherein comparing at least the portion of the received signal with the one or more reference signals includes matching in a time domain by correlating the at least a portion of the received signal with one or more waveforms of the one or more reference signals.

16. The method of claim 13, wherein comparing at least the portion of the received signal with the one or more reference signals includes frequency-domain matching at least a portion of the received signal with one or more frequency-domain spectra of the one or more reference signals.

17. The method of claim 13, wherein comparing at least the portion of the received signal with the one or more reference signals includes wavelet-domain matching at least a portion of the received signal with one or more wavelet-domain transforms of the one or more reference signals.

18. The method of claim 13, wherein the received signal was detected by converting a detected vibrational energy to the received signal.

19. The method of claim 13, wherein the processor is further configured to filter a background noise included in the received signal.

20. A computer program product for determining a touch contact object type, the computer program product being embodied in a non-transitory computer readable storage medium and comprising computer instructions for:
  sending a sent signal to be used to propagate a freely propagating signal through a propagating medium with a touch input surface, wherein the freely propagating signal has been allowed to freely propagate through the propagating medium in a plurality directions to a plurality of receivers on multiple axes of the propagating medium; and
  receiving a received signal detected due to a touch input object contacting the touch input surface, wherein the received signal includes the freely propagating signal that has been disturbed by the touch input object;
  comparing at least a portion of the received signal with one or more reference signals of one or more touch input object types, wherein comparing at least the portion of the received signal with the one or more reference signals of the one or more touch input object types includes comparing a portion of the freely propagating signal that has been disturbed by the touch input object with the one or more reference signals of the one or more touch input object types; and
  determining based at least in part on the comparison a location of the touch input object contacting the surface.

* * * * *